United States Patent
Chow

(10) Patent No.: US 6,996,124 B1
(45) Date of Patent: Feb. 7, 2006

(54) MECHANISM TO STRIP LARQ HEADER AND REGENERATE FCS TO SUPPORT SLEEP MODE WAKE UP

(75) Inventor: Peter Ka-Fai Chow, San Jose, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 1067 days.

(21) Appl. No.: 09/816,706

(22) Filed: Mar. 23, 2001

(51) Int. Cl.
*H04J 3/16* (2006.01)

(52) U.S. Cl. ........................ 370/466; 370/474

(58) Field of Classification Search ............... 370/464, 370/465, 466, 467, 470, 471, 474, 475, 476
See application file for complete search history.

(56) References Cited

U.S. PATENT DOCUMENTS

| | | | | |
|---|---|---|---|---|
| 5,251,205 A | * | 10/1993 | Callon et al. ............... | 370/392 |
| 5,999,541 A | * | 12/1999 | Hinchey et al. ............ | 370/466 |
| 6,335,933 B1 | * | 1/2002 | Mallory ...................... | 370/394 |

FOREIGN PATENT DOCUMENTS

| | | |
|---|---|---|
| WO | 9613106 | 5/1996 |
| WO | WO9613106 A * | 5/1996 |
| WO | 0072498 | 11/2000 |

OTHER PUBLICATIONS

Frank, Edward H. et al., "Connecting the Home with a Phone Line Network Chip Set," IEEE Mar.-Apr. 2000, pp. 27-38.

* cited by examiner

*Primary Examiner*—Huy D. Vu
*Assistant Examiner*—Daniel Ryman
(74) *Attorney, Agent, or Firm*—Winstead Sechrest & Minick P.C.

(57) ABSTRACT

The present invention provides a method for supporting sleep mode wake up in a home phone line network. The method includes: detecting a limited automatic repeat request (LARQ) header in a frame; stripping the LARQ header and a frame check sequence (FCS) in the frame; recalculating the FCS for the stripped frame; and adding the recalculated FCS to the stripped frame. The method strips the LARQ header from a HPNA frame before it is sent to an Ethernet controller. By stripping the LARQ header, the Ethernet controller will correctly find the set byte location for the wake pattern and attempts to match the bit pattern with the wake pattern. In this manner, sleep mode wake up is supported.

12 Claims, 4 Drawing Sheets

US 6,996,124 B1

MECHANISM TO STRIP LARQ HEADER AND REGENERATE FCS TO SUPPORT SLEEP MODE WAKE UP

FIELD OF THE INVENTION

The present invention relates to received data packets in a network, and more particularly to the removing unwanted header information to from received data packets in the network.

BACKGROUND OF THE INVENTION

Home networks are becoming more common and desirable for connecting computers within a home. One type of home network is the home phone line network which uses telephone lines typically installed in residence homes for communication between computers in the home. The Home Phone Line Networking Alliance (HPNA) has published a specification to standardize the behavior of home phone line networks.

FIG. 1 illustrates a home phone line network in accordance with the present invention. The preferred embodiment of the network complies with the Home Phoneline Networking Alliance specification version 2.0 (HPNA 2.0). The network allows multiple computers to communicate through telephone wires typically installed in residential homes. The network comprises a control chip 100. The chip 100 further comprises a Media Independent Interface (MII) 106, a Media Access Control (MAC) 108, and a Physical Layer (PHY) 110. The chip 100 implements the HPNA 2.0 specification. The chip 100 receives a signal containing data packets through the telephone wires via a phone jack 102. There is an analog front end (AFE) 104 which processes the signal between the chip 100 and the telephone wires. The chip 100 then processes the packets received in the signal from the AFE 104, and outputs a signal to the Host MAC 114 or to an Ethernet controller 112.

As is known in the art, the Ethernet controller 112 can be configured to power down, or "sleep", when not used. A system administration on a remote site may "wake up" the Ethernet controller 112 by sending a frame through the chip 100 and to the Ethernet controller 112. The frame has a particular bit pattern, the "wake pattern", at a set byte location in the frame. To determine if it should wake, the Ethernet controller 112 counts the bytes in the frame until it reaches the set byte location. The Ethernet controller 112 then attempts to match the bit pattern at the set byte location with the wake pattern. If there is a match, then the Ethernet controller 112 wakes and powers up. Otherwise, the Ethernet controller 112 continues to sleep.

However, under HPNA 2.0, the frame may contain an additional 8-byte Limited Automatic Repeat Request (LARQ) in its header. The LARQ 110 conveys link layer priority information and provides a negative acknowledgment protocol to increase the speed of frame retransmission. The Ethernet protocol used by the Ethernet controller 112 does not recognize or expect the LARQ header. When a HPNA frame with the LARQ header and the wake pattern is sent to the Ethernet controller 112, the Ethernet controller 112 counts the bytes to the set byte location and attempts to match the bit pattern with the wake pattern. However, since the LARQ header has added 8 bytes to the frame, the location at which the Ethernet controller 112 attempts to match the bit pattern is not where the wake pattern is actually located. The Ethernet controller 112 thus does not wake up.

Accordingly, there exists a need for a mechanism to strip the LARQ header to support remote wake up. The present invention addresses such a need.

SUMMARY OF THE INVENTION

The present invention provides a method for supporting sleep mode wake up in a home phone line network. The method includes: detecting a limited automatic repeat request (LARQ) header in a frame; stripping the LARQ header and a frame check sequence (FCS) in the frame; recalculating the FCS for the stripped frame; and adding the recalculated FCS to the stripped frame. The method strips the LARQ header from a HPNA frame before it is sent to an Ethernet controller. By stripping the LARQ header, the Ethernet controller will correctly find the set byte location for the wake pattern and attempts to match the bit pattern with the wake pattern. In this manner, sleep mode wake up is supported.

DETAILED DESCRIPTION

The present invention provides a mechanism to strip the LARQ header to support remote wake up. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

To more particularly describe the features of the present invention, please refer to FIGS. 2 through 4 in conjunction with the discussion below.

Figure 1:
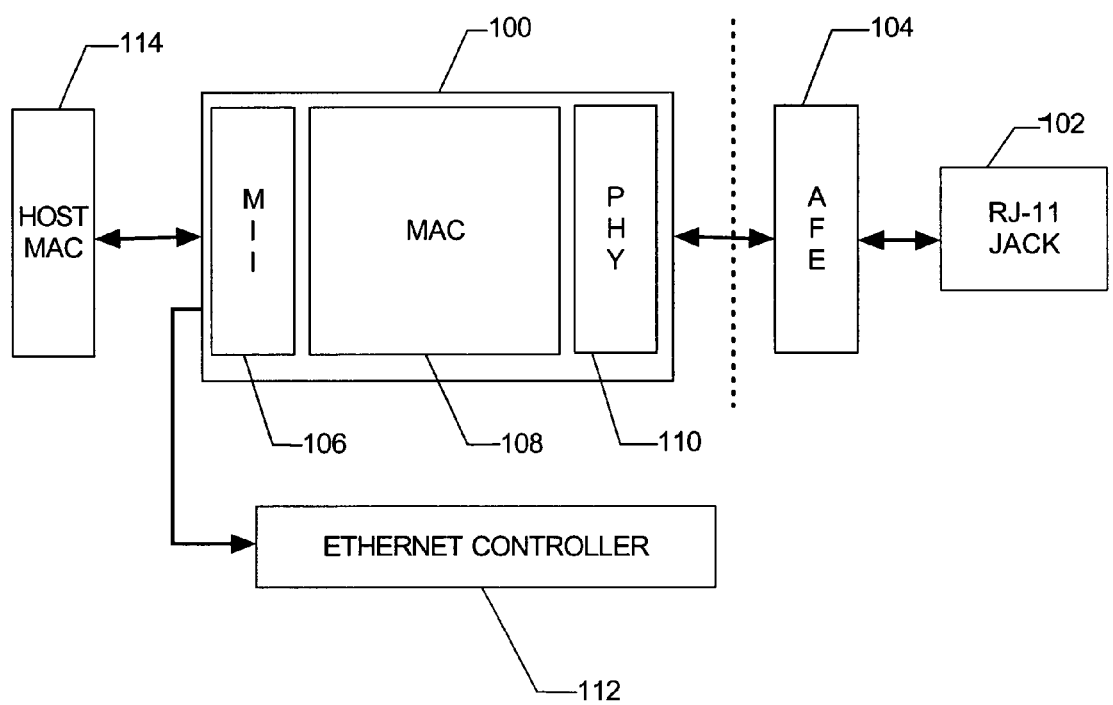
FIG. 1 illustrates a home phone line network in accordance with the present invention.
Figure 2:
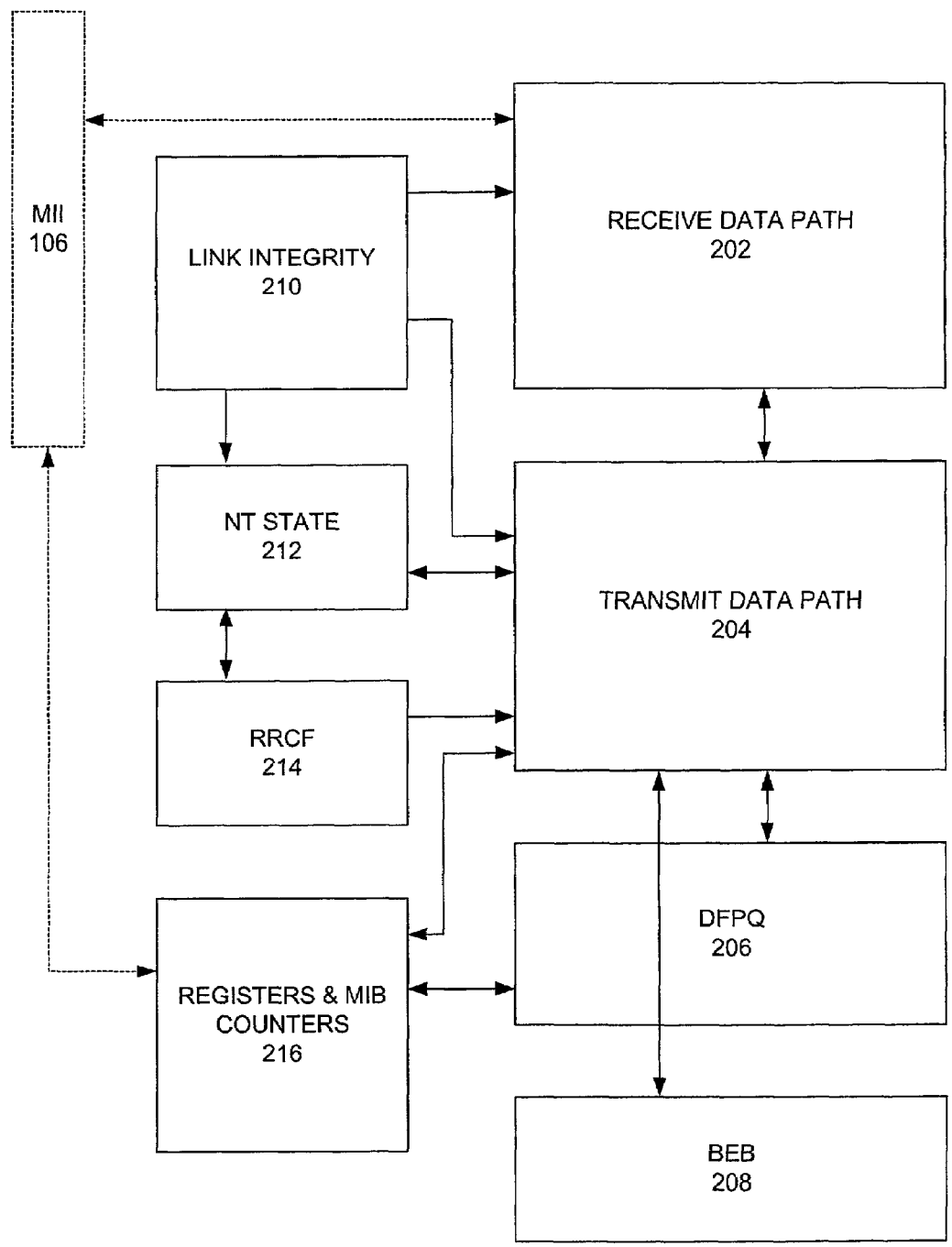
FIG. 2 illustrates a preferred embodiment of a MAC in accordance with the present invention.

FIG. 2 illustrates a preferred embodiment of a MAC in accordance with the present invention. The MAC comprises a Receive Data Path 202, a Transmit Data Path 204, a Distributed Fair Priority Queuing (DFPQ) 206, a Binary Exponential Backoff (BEB) 208, a Link Integrity 210, a Network State 212, a Rate Request Control Frame (RRCF) 214, a plurality of registers and Management Information Base (MIB) counters 216.

The Receive Data Path 202 receives data packets from the PHY 110 and sends data packets either to the MII 106. In the preferred embodiment, after each data packet sent by the Receive Data Path 202, another packet, referred to herein as a "frame status frame", is sent immediately following. The frame status frame contains certain status information required by subsequent processes.

The Transmit Data Path 204, which receives data packets from the MII 106 and transmits them to the PHY 110.

The DFPQ 206 and the BEB 208 provide collision resolution. The HPNA 2.0 specification supports both a 10 megabyte per second (mbps) data rate and a 1 mbps data rate. The DFPQ 206 provides collision resolution for the 10 mbps data rate, while the BEB 208 provides collision resolution for the 1 mbps data rate. In the preferred embodiment, the PHY 110 will provide a collision detect signal. Either the DFPQ 206 or the BEB 208 will then attempt to resolve the collision.

The Link Integrity 210 monitors the physical network conditions. In the preferred embodiment, the Link Integrity 210 updates a link status bit in a link register. The Link Integrity 210 also sends link packets in accordance with HPNA 2.0.

The Network State 212 monitors the current mode of the MAC 108, i.e., whether the MAC 108 is operating in the 10 mbps data rate mode ("10M8") or the 1 mbps data rate mode ("1M8").

The RRCF block (214) sends a RRCF whenever the MAC 108 transitions between data rates. The RRCF is used to perform the rate negotiation function, i.e., to determine what is the data rate to communicate between different stations in a home phone line network.

The registers and MIB counters 216 provides programmability to the MAC 108 and handles error event counting.

Figure 3:
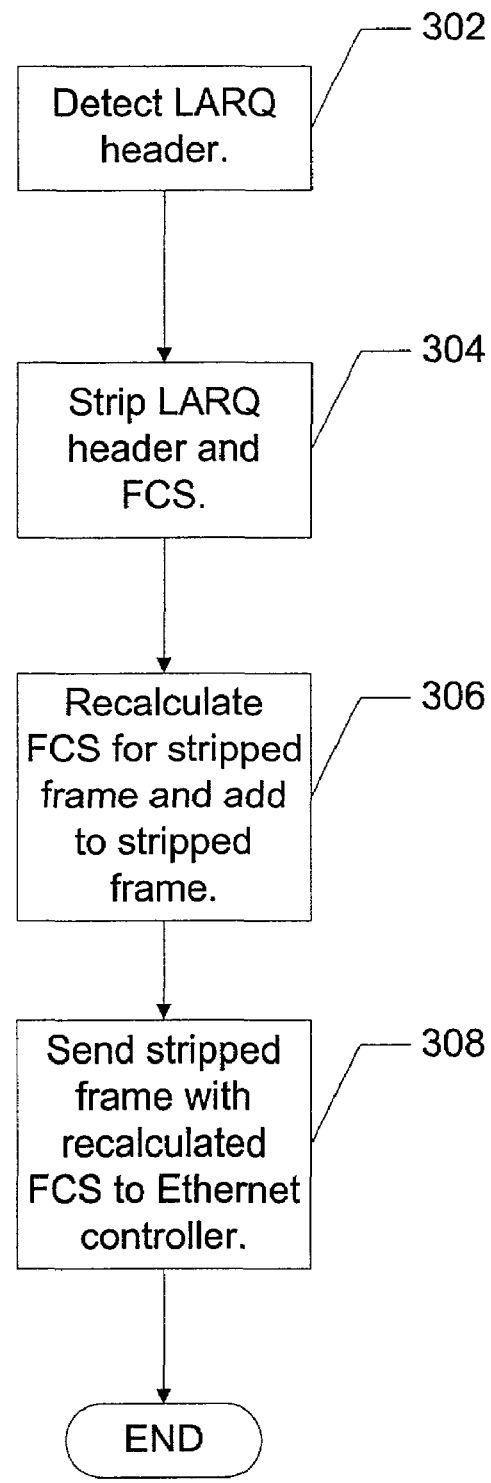
FIG. 3 is a flowchart illustrating a preferred embodiment of a method to strip the LARQ header to support remote wake up in accordance with the present invention.

FIG. 3 is a flowchart illustrating a preferred embodiment of a method to strip the LARQ header to support remote wake up in accordance with the present invention. In the preferred embodiment, the method is provided as part of the Receive Data Path 202. First, the Receive Data Path detects the LARQ header in a frame, via step 302. Next, the LARQ header and the frame check sequence (FCS) of the frame are stripped, via step 304. The FCS is the last four bytes of a frame which is used to determine whether or not the frame contains errors. In the preferred embodiment, the information in the stripped LARQ header is placed into the frame status frame which will immediately follow the stripped frame. In this way, the LARQ header information is still available to other processes. The Receive Data Path 202 then recalculates the FCS for the stripped frame and adds it to the stripped frame, via step 306. This recalculation is necessary because otherwise, the Ethernet controller 112 would erroneous determine that the stripped frame has errors because the LARQ is missing. Then, the stripped frame with the recalculated FCS is sent to the Ethernet controller 112, via step 308.

In the preferred embodiment, this stripping of the LARQ header may be user programmable. For example, the setting of a register is used to activate the stripping of the LARQ header as described above. The user may program the MAC such that whenever the Ethernet controller 112 goes into a sleep mode, the register is set and the LARQ header is stripped. Otherwise, the register is not set, and the LARQ header in not stripped.

In the preferred embodiment, the method to strip the LARQ header is implemented in hardware. However, one of ordinary skill in the art will understand that the method may be implemented in software, or a combination of hardware and software, without departing from the spirit and scope of the present invention.

Figure 4:
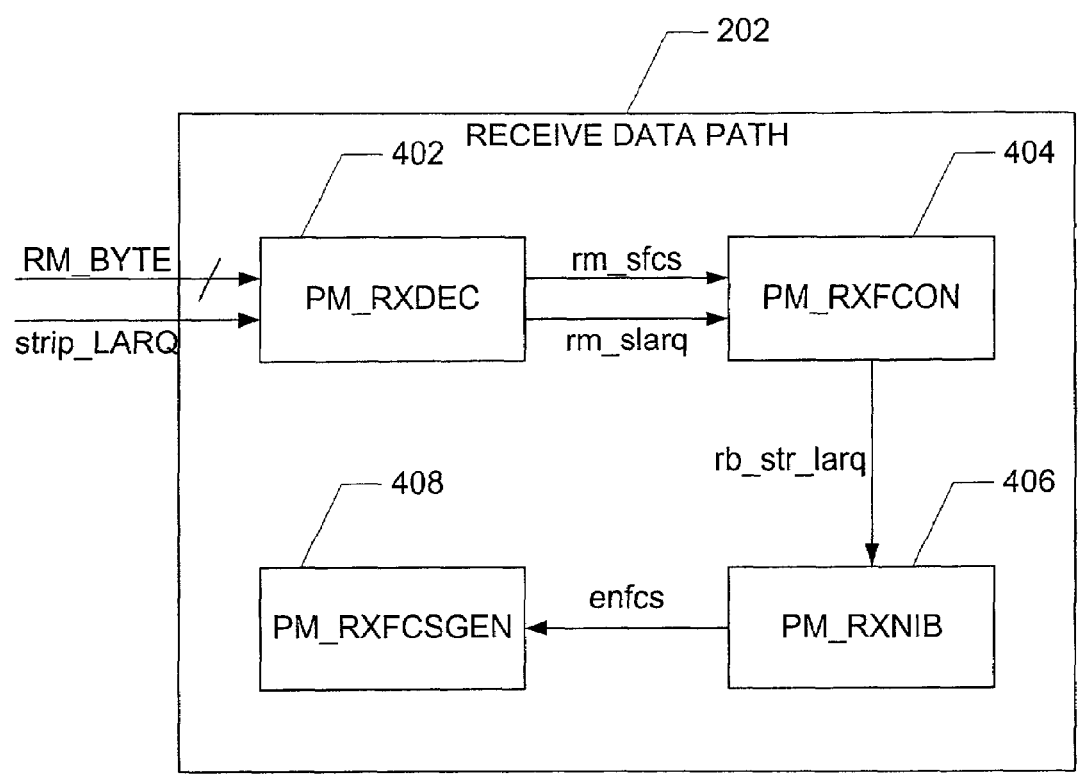
FIG. 4 illustrates a preferred embodiment of a Receive Data Path which strips the LARQ header to support remote wake up in accordance with the present invention.

FIG. 4 illustrates a preferred embodiment of a Receive Data Path which strips the LARQ header to support remote wake up in accordance with the present invention. The Receive Data Path 202 comprises a PM_RXDEC logic block 402, a PM_RXFCON logic block 404, a PM_RXNIB logic block 406, and a PM_RXFCSGEN logic block 408. The registers in the Registers and MIB Counters 216 asserts a signal, strip_LARQ, to the PM_RXDEC 402 to indicate that the LARQ header stripping is enabled. When a frame with a LARQ header is received via data buses RM)BYTE to the PM_RXDEC 402, the LARQ header is stripped from the frame, via step 302. The PM_RXDEC 402 then asserts the rm_sfcs signal and the rm_slarq signal to the PM_RXFCON 404. The asserted rm_sfcs signal indicates that the FCS in the frame is to be stripped. The asserted rm_slarq signal indicates that the LARQ in the frame is to be stripped. The PM_RXFCON 404 then strips the FCS and the LARQ, via step 304. Next, the PM_RXFCON 404 asserts a rb_str_larq signal to the PM_RXNIB 406. The asserted rb_str_larq signal indicates that the LARQ has been stripped from the frame. The PM_RXNIB 406 generates the frame accordingly. The PM_RXNIB 406 asserts an enfcs signal to the PM_RXFCSGEN 408. The asserted enfcs signal enables FCS recalculation for the stripped frame. The PM_RXFCSGEN 408 then recalculates the FCS for the stripped frame, via step 306. The recalculated FCS is added to the stripped frame, and this frame is sent to the Ethernet controller 112, via step 308.

A method to strip the LARQ header to support remote wake has been disclosed. The method strips the LARQ header from a HPNA frame before it is sent to an Ethernet controller. By stripping the LARQ header, the Ethernet controller will correctly find the set byte location for the wake pattern and attempts to match the bit pattern with the wake pattern. In this manner, sleep mode wake up is supported.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for supporting sleep mode wake up in a home phone line network, comprising the steps of:
   (a) detecting a limited automatic repeat request (LARQ) header in a frame;
   (b) stripping the LARQ header and a frame check sequence (FCS) in the frame;
   (c) recalculating the FCS for the stripped frame; and
   (d) adding the recalculated FCS to the stripped frame.

2. The method of claim 1, wherein the stripping step (b) further comprises:
   (b 1) placing information in the LARQ header in a frame status frame which will follow the stripped frame.

3. The method of claim 1, further comprising:
   (e) sending the stripped frame with the recalculated FCS to an Ethernet controller.

4. The method of claim 3, further comprising:
   (f) determining if a bit pattern at a set byte location in the stripped frame matches a wake pattern.

5. A home phone line controller, comprising:
   a first logic block for detecting a LARQ header in a frame;
   a second logic block for stripping the LARQ header and a FCS in the frame; and
   a third logic block for recalculating the FCS for the stripped frame and for adding the recalculated FCS to the stripped frame.

6. The controller of claim 5, wherein an asserted first signal to the first logic block indicates that the LARQ header is enabled and must be stripped from the frame.

7. The controller of claim 5, wherein the first logic block asserts a second signal and a third signal to the second logic block, wherein the second signal indicates that the FCS is to be stripped from the frame, wherein the third signal indicates that the LARQ header is to be stripped from the frame.

8. The controller of claim 5, wherein an asserted fourth signal to the third logic block enables the recalculation of the FCS.

9. A system, comprising:
- an Ethernet controller in a sleep mode; and
- a home phone line network controller, wherein the home phone line network controller comprises:
    - a first logic block for detecting a LARQ header in a frame,
    - a second logic block for stripping the LARQ header and a FCS in the frame, and
    - a third logic block for recalculating the FCS for the stripped frame and for adding the recalculated FCS to the stripped frame.

10. The system of claim 9, wherein an asserted first signal to the first logic block indicates that the LARQ header is enabled and must be stripped from the frame.

11. The system of claim 9, wherein the first logic block asserts a second signal and a third signal to the second logic block, wherein the second signal indicates that the FCS is to be stripped from the frame, wherein the third signal indicates that the LARQ header is to be stripped from the frame.

12. The system of claim 9, wherein an asserted fourth signal to the third logic block enables the recalculation of the FCS.

* * * * *